(12) United States Patent
Deng et al.

(10) Patent No.: US 11,693,304 B2
(45) Date of Patent: Jul. 4, 2023

(54) HOMOGENIZING MODULE AND PROJECTION APPARATUS

(71) Applicant: Coretronic Corporation, Hsin-Chu (TW)

(72) Inventors: Yu-Hsiang Deng, Hsin-Chu (TW); Chen-Wei Fan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/666,564

(22) Filed: Feb. 8, 2022

(65) Prior Publication Data
US 2022/0269156 A1   Aug. 25, 2022

(30) Foreign Application Priority Data
Feb. 23, 2021   (CN) .......................... 202120397532.9

(51) Int. Cl.
*G03B 21/20* (2006.01)
*G02B 5/02* (2006.01)
*G02B 27/09* (2006.01)

(52) U.S. Cl.
CPC ......... *G03B 21/208* (2013.01); *G02B 5/0257* (2013.01); *G02B 5/0278* (2013.01); *G02B 27/0961* (2013.01)

(58) Field of Classification Search
CPC .. G03B 21/208; G02B 5/0257; G02B 5/0278; G02B 27/0961; G02B 3/0062; H04N 9/3152
See application file for complete search history.

(56) References Cited

U.S. PATENT DOCUMENTS

2017/0123300 A1*   5/2017   Shishido .............. G03B 21/208

FOREIGN PATENT DOCUMENTS

| CN | 101788750 | 7/2010 |
|---|---|---|
| CN | 107861178 | 3/2018 |
| TW | 201520671 | 6/2015 |

* cited by examiner

*Primary Examiner* — Ryan D Howard
(74) *Attorney, Agent, or Firm* — JCIPRNET (57) ABSTRACT

A homogenizing module and a projection apparatus are provided. The homogenizing module is configured to homogenize a beam and includes an anisotropic diffuser and a homogenizer. The anisotropic diffuser is located on a transmission path of the beam. The beam has a first divergence angle in a first direction and a second divergence angle in a second direction after passing through the anisotropic diffuser. The first divergence angle is greater than the second divergence angle. The homogenizer is located on a transmission path of the beam from the anisotropic diffuser, and the homogenizer includes multiple optical elements. The size of any of the multiple optical elements in the first direction is greater than the size thereof in the second direction. The first direction is perpendicular to the second direction.

15 Claims, 8 Drawing Sheets

| | Anisotropic diffuser | | | | | | | | | | | Homogenizer | | | | | | | | |
|---|---|---|---|---|---|---|---|---|---|---|---|---|---|---|---|---|---|---|---|---|
| | 10 | 11 | 12 | 13 | 14 | 15 | 16 | 17 | 18 | 19 | 20 | 21 | 22.5 | 23 | 24 |
| The first divergence angle | 9 | 9 | 9 | 9 | 9 | 9 | 9 | 9 | 9 | 9 | 9 | 9 | 9 | 9 | 9 |
| The second divergence angle | 9 | 9 | 9 | 9 | 9 | 9 | 9 | 9 | 9 | 9 | 9 | 9 | 9 | 9 | 9 |
| The second ratio | 1 | 1.11 | 1.22 | 1.33 | 1.44 | 1.56 | 1.67 | 1.78 | 1.89 | 2 | 2.11 | 2.22 | 2.33 | 2.5 | 2.56 | 2.67 |
| The first acceptance angle | 16 | 16 | 16 | 16 | 16 | 16 | 16 | 16 | 16 | 16 | 16 | 16 | 16 | 16 | 16 |
| The second acceptance angle | 9 | 9 | 9 | 9 | 9 | 9 | 9 | 9 | 9 | 9 | 9 | 9 | 9 | 9 | 9 |
| The first ratio | 1.78 | 1.78 | 1.78 | 1.78 | 1.78 | 1.78 | 1.78 | 1.78 | 1.78 | 1.78 | 1.78 | 1.78 | 1.78 | 1.78 | 1.78 |
| The ratio of the second ratio to the first ratio | 0.56 | 0.63 | 0.69 | 0.75 | 0.81 | 0.88 | 0.94 | 1 | 1.06 | 1.13 | 1.19 | 1.25 | 1.31 | 1.41 | 1.44 | 1.5 |

FIG. 6

HOMOGENIZING MODULE AND PROJECTION APPARATUS

CROSS-REFERENCE TO RELATED APPLICATION

This application claims the priority benefit of China application serial no. 202120397532.9, filed on Feb. 23, 2021. The entirety of the above-mentioned patent application is hereby incorporated by reference herein and made a part of this specification.

BACKGROUND

Technical Field

The disclosure relates to an optical module and an optical apparatus, and particularly relates to a homogenizing module and a projection apparatus.

Description of Related Art

Recently, projection apparatuses mainly adopting solid-state light sources such as light-emitting diodes (LED) and laser diodes have gradually gained a place in the market. Since laser diodes have a higher luminous efficiency by about 20%, to break through the light source limitation of the light-emitting diodes, models adopting laser diodes as the light source for the projection apparatus have gradually emerged.

Generally speaking, a projection apparatus using laser diodes as the light source is provided with optical modules such as a light source module, a homogenizing module, a light valve, and a projection lens, etc. Specifically, a beam provided by a light combining module passes through the homogenizing module to homogenize the beam. The homogenized beam is then transmitted to the subsequent light valve to be projected onto the screen through the projection lens.

However, in the conventional projection apparatus, the relationships between the angles of the beam provided by the light source module in different spatial dimensions and the acceptance angles of the homogenizing module in different dimensions do not match each other. Therefore, when the angle of the beam in one dimension is matched with the acceptance angle of a homogenizing element in the same dimension, the angle of the beam in another dimension is unable to be matched with the acceptance angle of the homogenizing element in the corresponding dimension. For example, when the homogenizing module is a microarray lens, the homogenizing module includes multiple lens elements. Each lens element has different acceptance angles in a long axis direction and a short axis direction respectively. When the angle of the beam is matched with the acceptance angle of the lens element in the short axis direction, the beam passing through the lens element may be unevenly distributed in the long axis direction, resulting in an uneven spatial distribution of light spots of respective color lights. In this way, color lights may be separated when the beam passing through or reflecting by the light valve. If the aperture value (F/#) of the projection lens is relatively small, due to the separation of different color lights, the colors of the image may be unevenly distributed. Also, if the angle of the beam is matched with the acceptance angle of the lens element in the long axis direction, when the beam passes through the lens element, a portion of the beam may be easily emitted to other non-corresponding lens elements in the short axis direction, causing stray light and resulting in efficiency loss.

The information disclosed in this "BACKGROUND" section is only for enhancement of understanding of the background of the described technology and therefore it may contain information that does not form the prior art that is already known to a person of ordinary skill in the art. Further, the information disclosed in this "BACKGROUND" section does not mean that one or more problems to be resolved by one or more embodiments of the disclosure was acknowledged by a person of ordinary skill in the art.

SUMMARY

The disclosure provides a homogenizing module capable of providing favorable homogeneity of light passing therethrough.

The disclosure provides a projection apparatus capable of providing an image with favorable quality.

Other objectives and advantages of the disclosure may be further understood from the technical features disclosed in the disclosure.

In order to achieve one or part or all of the above objectives or other objectives, an embodiment of the disclosure provides a homogenizing module. The homogenizing module is configured to homogenize a beam and includes an anisotropic diffuser and a homogenizer. The anisotropic diffuser is located on a transmission path of the beam. The beam has a first divergence angle in a first direction and a second divergence angle in a second direction after passing through the anisotropic diffuser, and the first divergence angle is greater than the second divergence angle. The homogenizer is located on a transmission path of the beam from the anisotropic diffuser, and the homogenizer includes multiple optical elements. A size of any one of the multiple optical elements in the first direction is greater than a size of the optical element in the second direction. The first direction is perpendicular to the second direction.

In order to achieve one or part or all of the above objectives or other objectives, an embodiment of the disclosure provides a projection apparatus. The projection apparatus includes a light source module, the homogenizing module, a light valve and a projection lens. The light source module is configured to provide the beam. The homogenizing module is located on a transmission path of the beam from the light source module, and is configured to convert the beam into an illumination beam. The light valve is located on a transmission path of the illumination beam, and is configured to convert the illumination beam into an image beam. The projection lens is located on a transmission path of the image beam and is configured to project the image beam.

Based on the above, the embodiments of the disclosure have at least one of the following advantages or effects. In the embodiments of the disclosure, the first divergence angle of the beam may be matched with a first acceptance angle of each optical element of the homogenizer through the configuration of the anisotropic diffuser, and the second divergence angle of the beam may be matched with a second acceptance angle of the each optical element of the homogenizer. In addition, a ratio of the first acceptance angle to the second acceptance angle is a first ratio, and a ratio of the first divergence angle to the second divergence angle is a second ratio, when the ratio of the second ratio to the first ratio is greater than 0.56 and less than 1.50, the uneven color distribution of the image may be avoided, and, as a result, the projection apparatus may provide images with favorable quality.

Other objectives, features and advantages of the disclosure will be further understood from the further technological features disclosed by the embodiments of the disclosure wherein there are shown and described preferred of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" Component is directly "adjacent to" "B" component or one or more additional components are between "A" component and "B" component. Accordingly, the drawings and descriptions will be regarded as illustrative in nature and not as restrictive.

Figure 1:
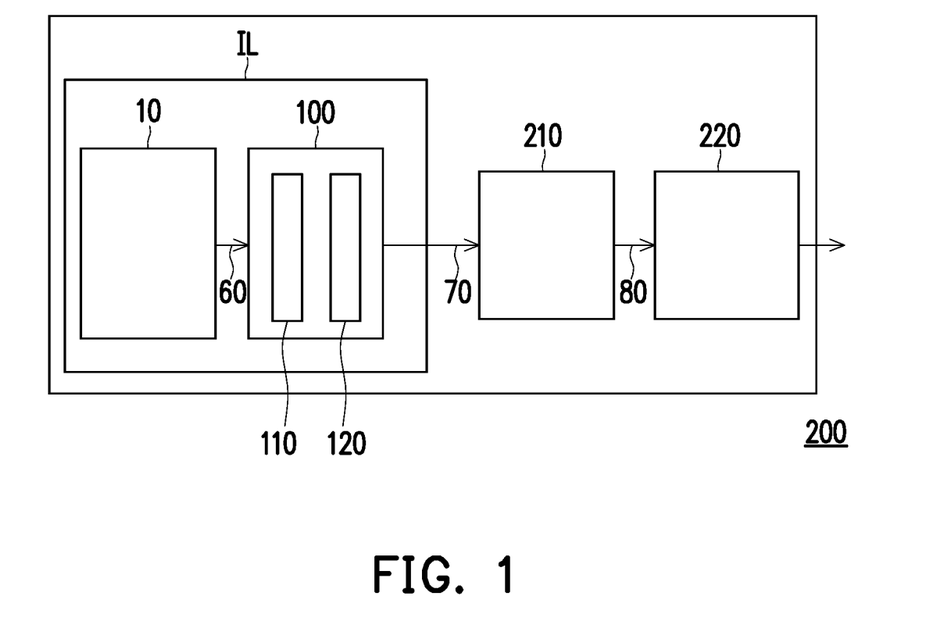
FIG. 1 is a block diagram of a projection apparatus according to an embodiment of the disclosure.

FIG. 1 is a block diagram of a projection apparatus according to an embodiment of the disclosure. Referring to FIG. 1, in this embodiment, a projection apparatus 200 includes an illumination system IL, a light valve 210 and a projection lens 220. The illumination system IL is configured to provide an illumination beam 70. The light valve 210 is disposed on the transmission path of the illumination beam 70 to modulate the illumination beam 70 into an image beam 80. The projection lens 220 is configured on the transmission path of the image beam 80 and is configured to project the image beam 80 onto an imaging surface (which is, for example, a screen or a wall) to form an image. After the illumination beam 70 of different colors is irradiated on the light valve 210, the light valve 210 converts the illumination beam 70 of different colors into the image beam 80 according to time sequence and transmits the image beam 80 to the projection lens 220. Therefore, the image of the image beam 80 converted by the light valve 210 and projected out of the projection apparatus 200 is a color image. In this embodiment, the light valve 210 is, for example, a digital micro-mirror device (DMD), and the projection lens 220 is, for example, a combination of one or more optical lenses with refractive power. The optical lens includes, for example, a non-planar lens such as a biconcave lens, a biconvex lens, a concave-convex lens, a convex-concave lens, a plano-convex lens, a plano-concave lens, etc., or various combinations thereof. The form and the type of the projection lens 220 are not particularly limited in the disclosure.

Furthermore, as shown in FIG. 1, in this embodiment, the illumination system IL includes a light source module 10 and a homogenizing module 100. The light source module 10 is configured to provide a beam 60, and the homogenizing module 100 is configured to homogenize the beam 60 and output the illumination beam 70. The homogenizing module 100 includes an anisotropic diffuser 110 and a homogenizer 120. The structure of the homogenizing module 100 will be further explained below with reference to FIG. 2A to FIG. 3B.

Figure 2A:
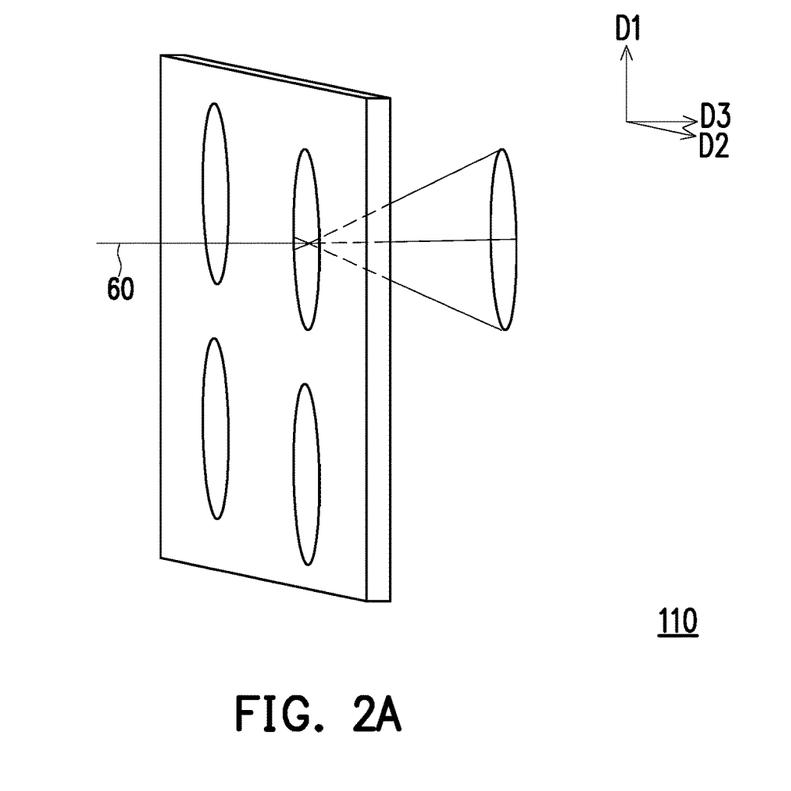
FIG. 2A is a schematic diagram of a beam passing through an anisotropic diffuser of FIG. 1.
Figure 2B:
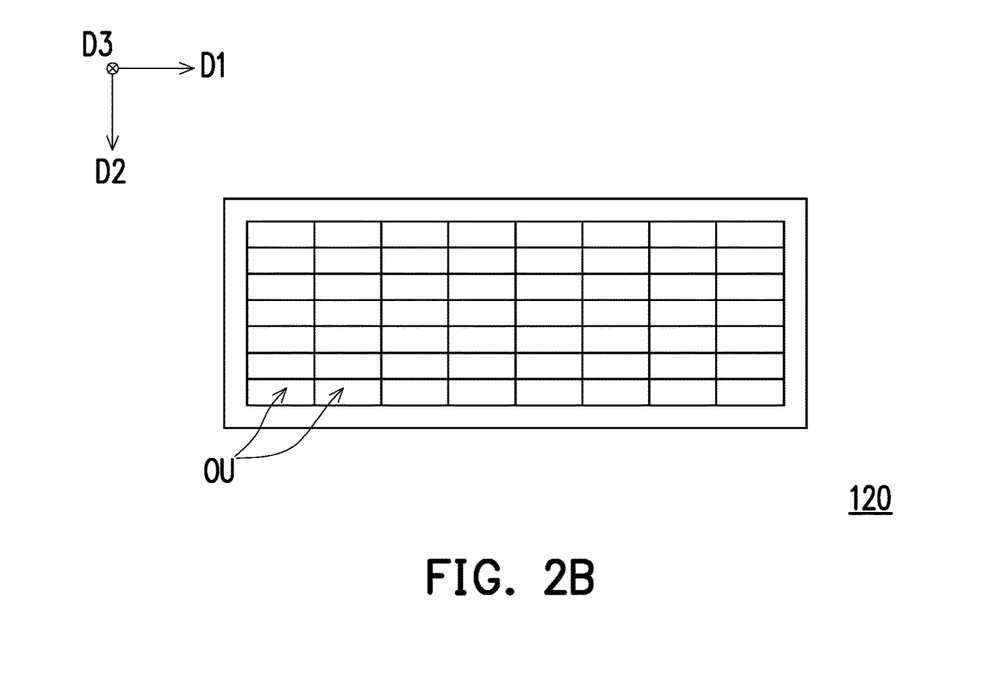
FIG. 2B is a top view of a homogenizer of FIG. 1.
Figure 2C:
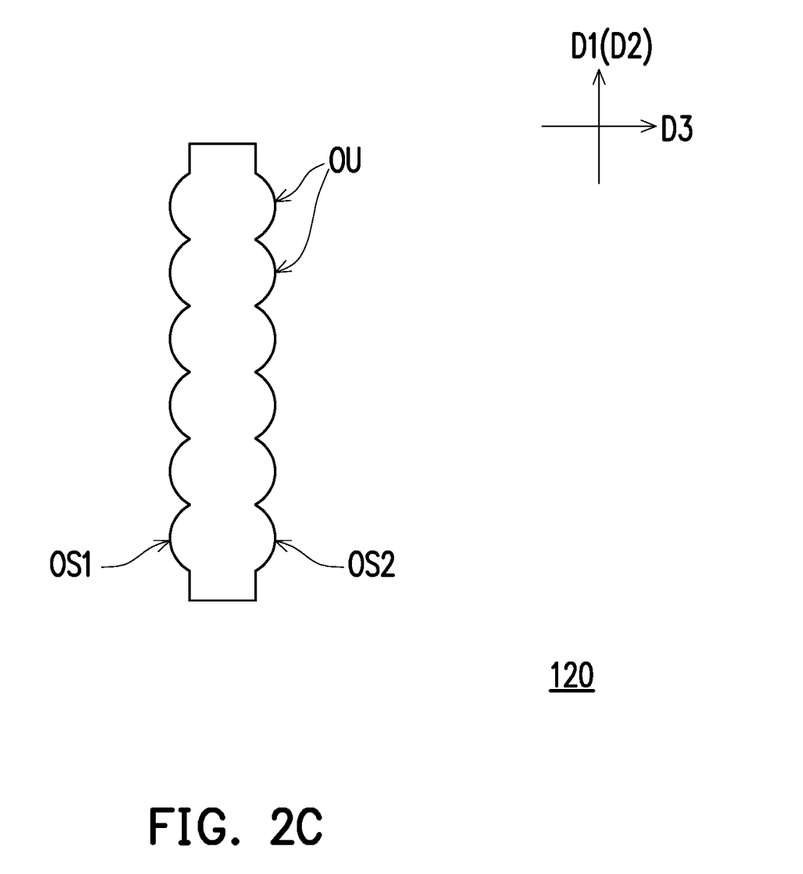
FIG. 2C is a side view of the homogenizer of FIG. 1.
Figure 3A:
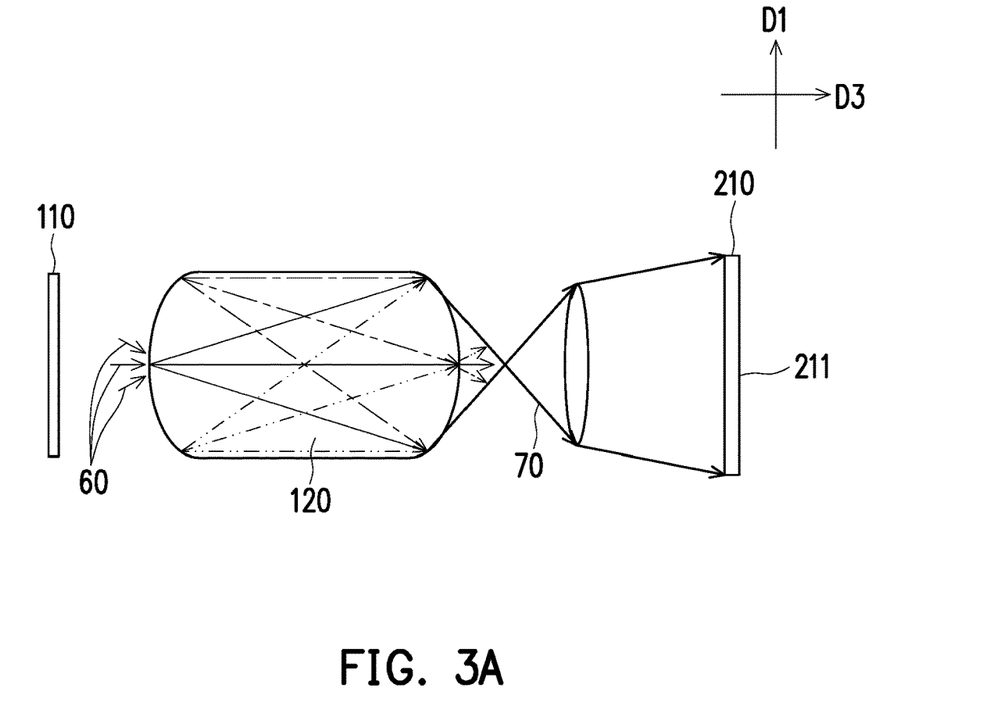
FIG. 3A is a schematic diagram of a light path of a beam passing through a homogenizing module of FIG. 1.
Figure 3B:
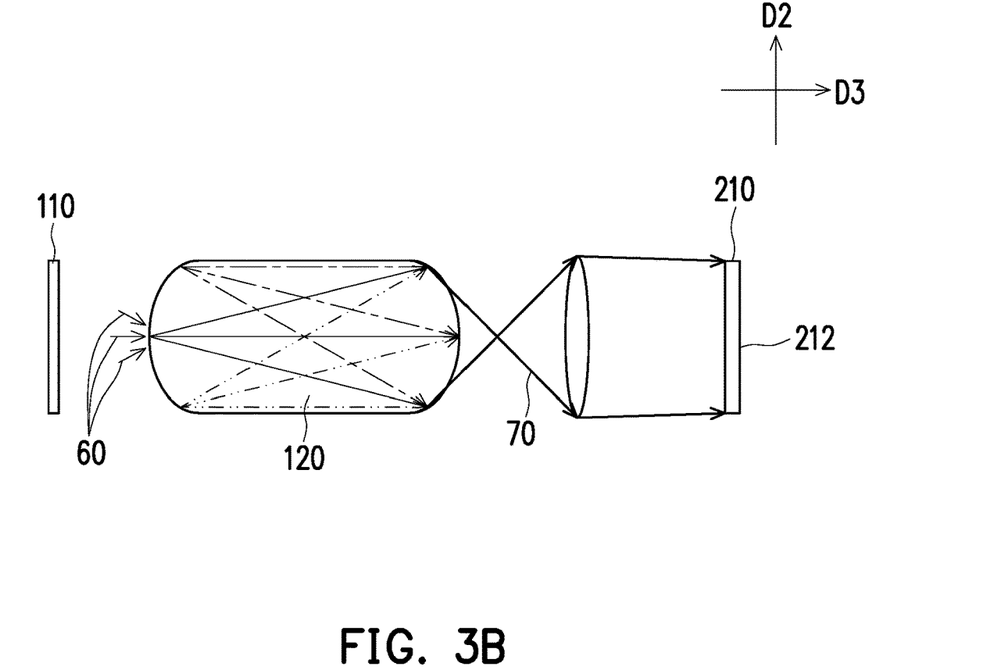
FIG. 3B is a schematic diagram of the light path of the beam passing through the homogenizing module of FIG. 1.

FIG. 2A is a schematic diagram of a beam passing through the anisotropic diffuser of FIG. 1. FIG. 2B is a top view of the homogenizer of FIG. 1. FIG. 2C is a side view of the homogenizer of FIG. 1. FIG. 3A is a schematic diagram of a light path of a beam passing through the homogenizing module of FIG. 1. FIG. 3B is a schematic diagram of a light path of the beam passing through the homogenizing module of FIG. 1. Specifically, as shown in FIG. 2A, the anisotropic diffuser 110 is located on a transmission path of the beam 60.

In this embodiment, the anisotropic diffuser 110 may allow the beam 60 passing therethrough to have different divergence angles in different directions, that is, the divergence capacity of the anisotropic diffuser 110 in a first direction D1 is different from the divergence capacity thereof in a second direction D2. In this embodiment, the divergence capacity of the anisotropic diffuser 110 in the first direction D1 is greater than the divergence capacity thereof in the second direction D2. In other words, the beam 60 has a first divergence angle in the first direction D1 and a second divergence angle in the second direction D2 after passing through the anisotropic diffuser 110, and the first divergence angle is greater than the second divergence angle. The first direction D1 is perpendicular to the second direction D2. In addition, as shown in FIG. 2A, in this embodiment, the beam 60 from the light source module 10 passes through the anisotropic diffuser 110 along a third direction, and a third direction D3 is perpendicular to the first direction D1 and the second direction D2.

Moreover, in this embodiment, the anisotropic diffuser 110 is, for example, stationary with respect to the homogenizer 120, but the disclosure is not limited thereto. In other embodiments, the homogenizing module 100 may further include an actuator connected to the anisotropic diffuser 110 and configured to drive the anisotropic diffuser 110 to move reciprocally. Accordingly, the divergence angle of the beam passing through the anisotropic diffuser 110 may change in a time sequence, and, as a result, the spot distribution of the beam 60 may be changed over time, and the speckle effect may be eliminated.

On the other hand, as shown in FIG. 1, FIG. 2B and FIG. 2C, the homogenizer 120 is located on a transmission path of the beam 60 from the anisotropic diffuser 110, and the homogenizer 120 includes multiple optical elements OU. For example, in this embodiment, the homogenizer 120 is a monolithic micro-lens array. The homogenizer 120 has a first optical surface OS1 and a second optical surface OS2 opposite to each other, and the first optical surface OS1 is a surface of the monolithic micro-lens array facing the anisotropic diffuser 110, and the second optical surface OS2 is a surface of the monolithic micro-lens array facing away from the anisotropic diffuser 110. The optical elements OU are micro-lens elements of the monolithic micro-lens array which are arranged into an array, and are disposed on the first optical surface OS1 and the second optical surface OS2.

Specifically, as shown in FIG. 2B and FIG. 2C, the size of any one of the optical elements OU in the first direction D1 is greater than the size of the optical element OU in the second direction D2. In other words, since the size of each optical element OU in the first direction D1 is greater than the size of the optical element OU in the second direction D2, the first direction D1 is regarded as a long axis direction of the each optical element OU, and the second direction D2 is regarded as a short axis direction of the each optical element OU. The long axis direction and the short axis direction respectively correspond to a direction of a long side 211 and a direction of a short side 212 of the light valve 210. In other words, in this embodiment, the beam 60 has a first acceptance angle in the first direction D1 and a second acceptance angle in the second direction D2 after passing through each of the optical elements OU of the homogenizer 120. The ratio of the first acceptance angle to the second acceptance angle is a first ratio. The ratio of the size (length) of the long side 211 of the light valve 210 to the size (length) of the short side 212 of the light valve 210 may be substantially equal to the first ratio.

Specifically, in this embodiment, the anisotropic diffuser 110 may allow the beam 60 to have different divergence angles in different directions. Therefore, after the light beam 60 passes through the anisotropic diffuser 110, the first divergence angle and the second divergence angle of the light beam 60 may be adjusted corresponding to the first acceptance angle and the second acceptance angle of the each optical element OU of the homogenizer 120. In this way, as shown in FIG. 3A and FIG. 3B, the first divergence angle of the beam 60 passing through the anisotropic diffuser 110 may be matched with the first acceptance angle of the beam 60 passing through the each optical element OU of the homogenizer 120, and the second divergence angle of the beam 60 passing through the anisotropic diffuser 110 may be matched with the second acceptance angle of the beam 60 passing through the each optical element OU of the homogenizer 120. In this way, the beam 60 may have a homogenized spatial distribution after passing through the homogenizer 120, and the angular distribution of the beam 60 is homogenized when the beam 60 is transmitted to the light valve 210. For example, in this embodiment, the ratio of the first divergence angle to the second divergence angle may be a second ratio, and the ratio of the second ratio to the first ratio is greater than 0.56 and less than 1.50.

Figure 4A:
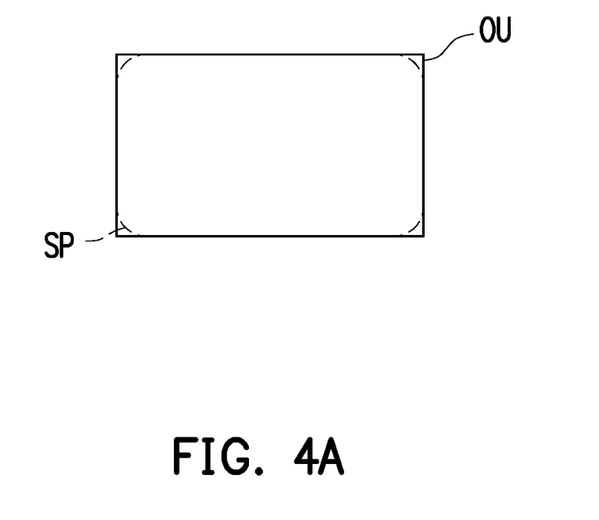
FIG. 4A is a schematic diagram of a spatial distribution of a beam passing through one of the optical units in the homogenizer of FIG. 1.
Figure 4B:
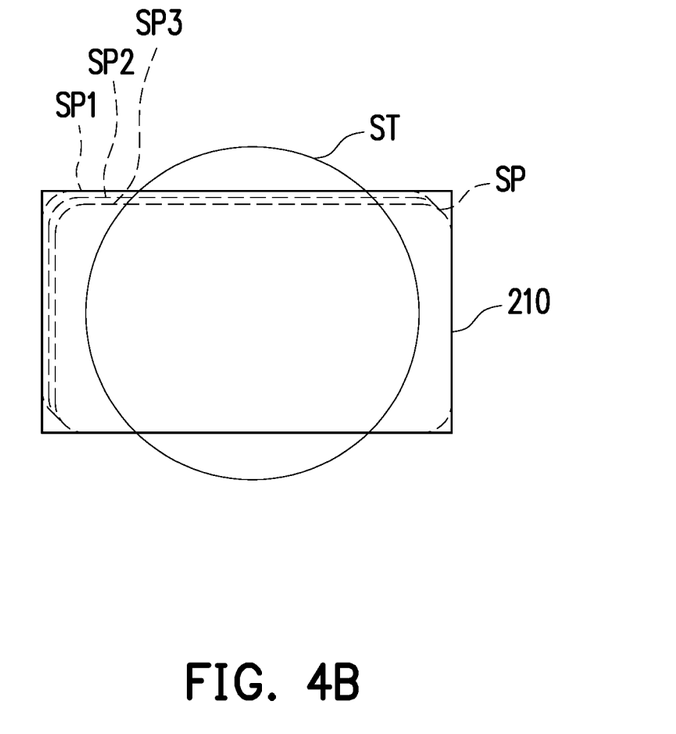
FIG. 4B is a schematic diagram of an angular spatial distribution of each color light of an illumination beam of FIG. 1 irradiating on a light valve.
Figure 4C:
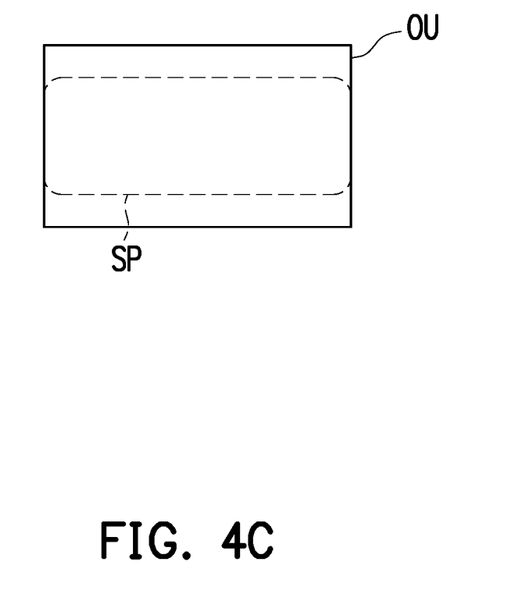
FIG. 4C is a schematic diagram of a spatial distribution of a beam passing through one of the optical units in a homogenizer according to a comparative example.
Figure 4D:
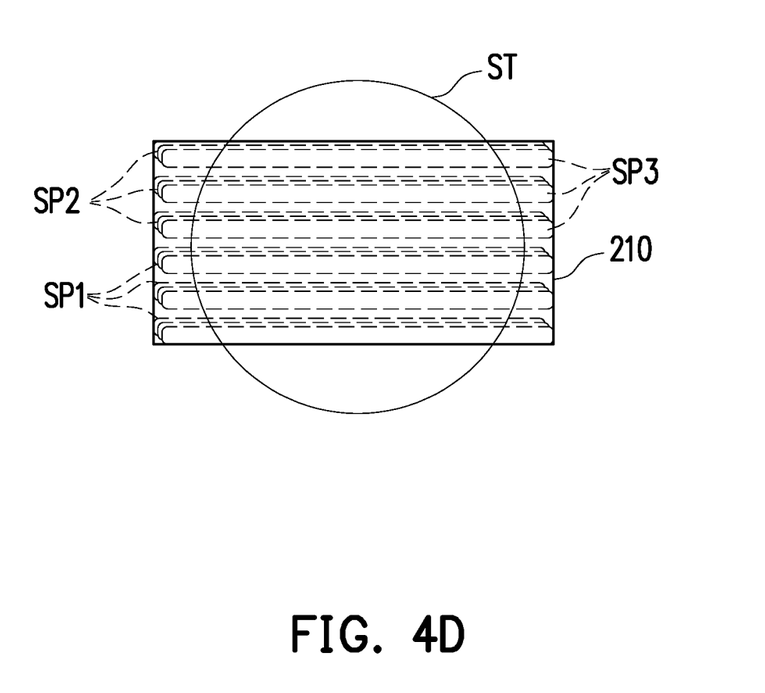
FIG. 4D is a schematic diagram of an angular spatial distribution of each color light of an illumination beam irradiating on a light valve according to a comparative example.
Figure 6:
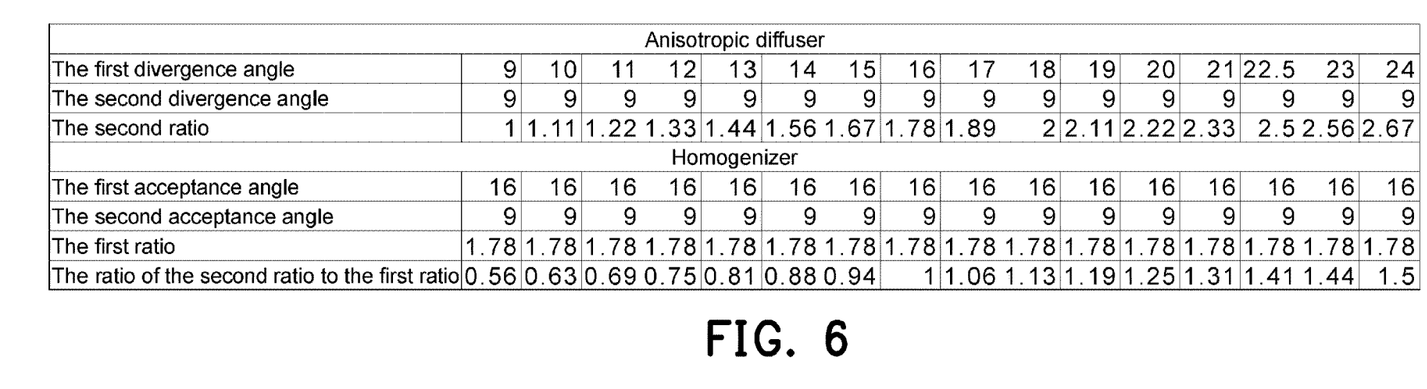
FIG. 6 is a table with a data sheet of the first ratio and the second ratio according to different embodiments.

The meaning of the above-mentioned values will be further explained as follows with reference to FIG. 4A to FIG. 4D and the table in FIG. 6. FIG. 4A is a schematic diagram of a spatial distribution of the beam 60 passing through any one of the optical elements OU of the homogenizer 120 of FIG. 1. FIG. 4B is a schematic diagram of an angular spatial distribution of each color light of the illumination beam 70 of FIG. 1 irradiating on the light valve 210. FIG. 4C is a schematic diagram of a spatial distribution of the beam 60 passing through any one of the optical elements OU of the homogenizer 120 according to a comparative example. FIG. 4D is a schematic diagram of the angular spatial distribution of the each color light of the illumination beam 70 irradiating on the light valve 210 according to a comparative example. FIG. 6 illustrates a table with a data sheet of the first ratio and the second ratio according to different embodiments. Specifically, FIG. 4A and FIG. 4C are schematic diagrams of the spatial distribution of the beam 60 passing through an exit surface of one of the optical elements OU of the homogenizer 120. As shown in the table of FIG. 6, in this embodiment, assuming that the ratio of the size (length) of the long side 211 of the light valve 210 to the size (length) of the short side 212 of the light valve 210 is 16 to 9, the first ratio of the homogenizer 120 is 16/9, which is approximately 1.78. Moreover, in this embodiment, the lower limit of the second ratio of the anisotropic diffuser 110 is 1, for the reason that if the second ratio is less than 1, the first divergence angle of the beam 60 in the first direction D1 may become smaller than the second divergence angle in the second direction D2, which does not meet the optical requirements. On the other hand, considering the upper limit of the second ratio of the anisotropic diffuser 110, the following needs to be further considered: when the first divergence angle is too large, a spot SP of the beam 60 passing through the homogenizer 120 is unable to completely overlap with any one of the optical elements OU, so when the illuminating beam 70 enters the light valve 210, the angle of the spot of the illuminating beam 70 is unable to completely overlap the effective region of the angular space of the light valve 210 (as shown in FIG. 4C). As a result, the angle of the spot of the each color light may be discretely distributed. Therefore, when an aperture value of the projection lens 220 is relatively small, the blocking ratios of the respective color lights by an aperture ST of the projection lens 220 are different, causing the angles of the spots SP1, SP2 and SP3 of the different color lights to exhibit separate color regions (as shown in FIG. 4D). As a result, the brightness difference among the three color lights increases, the color shift becomes severe, or the pure color brightness is reduced, and the brightness of a white point is reduced. In this embodiment, the upper limit of the second ratio of the anisotropic diffuser 110 is, for example, 2.67. By doing so, the color shift may fall within an acceptable range. Thus, when the ratio of the second ratio to the first ratio is greater than 0.56 and less than 1.50 in the embodiment, the phenomenon of uneven color distribution of the image may be avoided. Consequently, the projection apparatus may provide an image with favorable quality. Moreover, if the second ratio is equal to the first ratio, when the beam 60 passes through the homogenizer 120, the spot SP of the beam 60 may completely overlap with any one of the optical elements OU. Thus, it is possible that the angle of the spot of the illuminating beam 70 completely overlaps with the effective region of the angular space of the light valve 210. As a result, the color regions of the angles of the spots SP1, SP2, and SP3 of the respective color lights are complete, and the color shift may be eliminated (as shown in FIG. 4A and FIG. 4B). Accordingly, the projection apparatus may provide an image with favorable quality.

Although in the above embodiment, the ratio of the size of the long side 211 of the light valve 210 to the size of the short side 212 of the light valve 210 is described with an exemplary ratio of 16:9, the disclosure is not limited thereto. In other embodiments, when the ratio of the long side 211 to the short side 212 of the light valve 210 changes, the first ratio of the first acceptance angle to the second acceptance angle of the homogenizer 120 also changes correspondingly. Moreover, the upper limit and lower limit of the second ratio of the anisotropic diffuser 110 also changes accordingly. As long as the ratio of the second ratio to the first ratio is greater than 0.56 and less than 1.50, the phenomenon of uneven colors in an image may be avoided.

Also, in the above embodiment, although the homogenizer 120 is described as a monolithic micro-lens array as an example, the disclosure is not limited thereto. In another embodiment, the homogenizer 120 may also be a two-piece micro-lens array. Moreover, the phenomenon of uneven colors in an image may also be avoided through the configuration of the anisotropic diffuser 110. Hereinafter, another embodiment will be described as an example.

Figure 5:
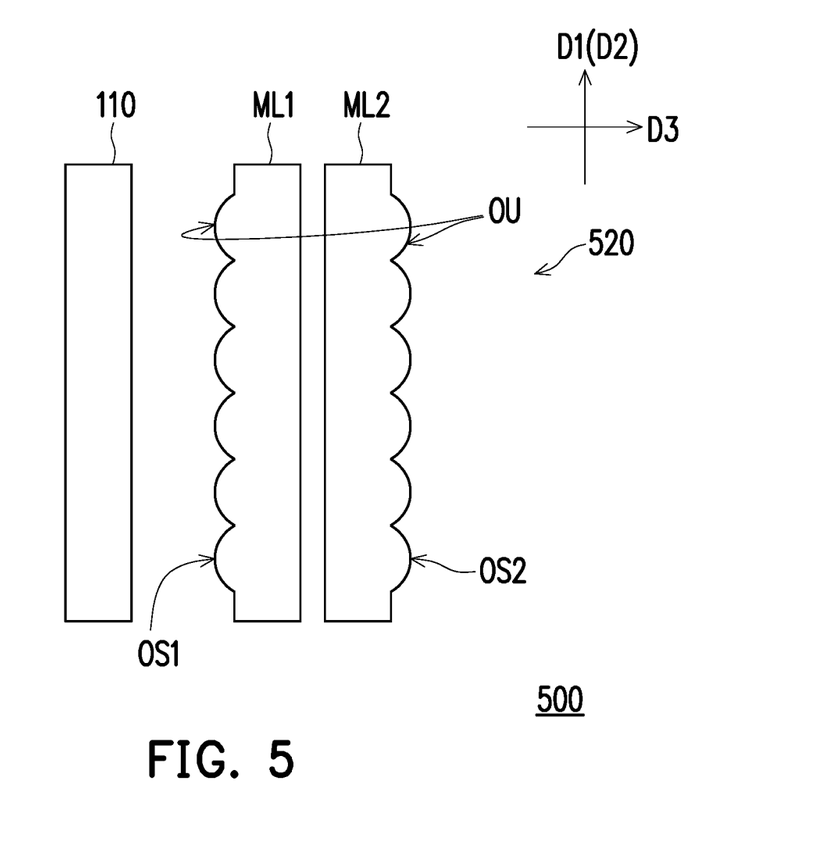
FIG. 5 is a side view of another homogenizer of FIG. 1.

FIG. 5 is a side view of another homogenizer of FIG. 1. Referring to FIG. 5, a homogenizer 520 of a homogenizing module 500 is similar to the homogenizer 120 of FIG. 2C, but the differences are as follows. Specifically, as shown in FIG. 5, in this embodiment, the homogenizer 520 of the homogenizing module 500 includes a first micro-lens array ML1 and a second micro-lens array ML2 aligned with each other, and a gap is provided between the first micro-lens array ML1 and the second micro-lens array ML2. The first optical surface OS1 is a surface of the first micro-lens array ML1 facing the anisotropic diffuser 110, and the second optical surface OS2 is a surface of the second micro-lens array ML2 facing away from the anisotropic diffuser 110. The optical elements OU of the homogenizer 520 include multiple micro-lens elements of the first micro-lens array ML1 and multiple micro-lens elements of the second micro-lens array ML2. In this way, the beam 60 has the first acceptance angle in the first direction D1 and the second acceptance angle in the second direction D2 after successively passing through the micro-lens elements of the first micro-lens array ML1 and the micro-lens elements of the second micro-lens array ML2. The ratio of the first acceptance angle to the second acceptance angle is also the first ratio. In this way, the homogenizing module 500 shares a similar structure with the homogenizing module 100, and effects and advantages similar to those of the homogenizing module 100, which will not be repeated in the following, may also be achieved by the homogenizing module 500. Moreover, when the homogenizer 520 replaces the homogenizer 120 of FIG. 2C and is applied to the projection apparatus 200 of FIG. 1, the projection apparatus 200 may also achieve the effects and advantages described above, which will not be repetitively described in the following.

In summary, the embodiments of the disclosure have at least one of the following advantages or effects. In the embodiments of the disclosure, through the configuration of the anisotropic diffuser, the first divergence angle of the beam may be matched with the first acceptance angle of each optical element of the homogenizer, and the second divergence angle of the beam may be matched with the second acceptance angle of the each optical element of the homogenizer. A ratio of the first acceptance angle to the second acceptance angle is a first ratio, and a ratio of the first divergence angle to the second divergence angle is a second ratio, when the ratio of the second ratio to the first ratio is greater than 0.56 and less than 1.50, the phenomenon of uneven colors of an image may be avoided, and the projection apparatus may provide an image with favorable quality.

The aforementioned description of the preferred embodiments of the disclosure has been presented for purposes of illustration and description. It is not intended to be exhaustive or to limit the disclosure to the precise form or to exemplary embodiments disclosed. Accordingly, the aforementioned description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A homogenizing module for homogenizing a beam, the homogenizing module comprising an anisotropic diffuser and a homogenizer, wherein:
the anisotropic diffuser is located on a transmission path of the beam, the beam has a first divergence angle in a first direction and a second divergence angle in a second direction after passing through the anisotropic diffuser, and the first divergence angle is greater than the second divergence angle; and
the homogenizer is located on a transmission path of the beam from the anisotropic diffuser, the homogenizer comprises a plurality of optical elements, and a size of one of the optical elements in the first direction is greater than a size of the one of the optical element in the second direction, wherein the first direction is perpendicular to the second direction.

2. The homogenizing module according to claim 1, wherein the beam has a first acceptance angle in the first direction and a second acceptance angle in the second direction after passing through each of the optical elements of the homogenizer, a ratio of the first acceptance angle to the second acceptance angle is a first ratio, a ratio of the first divergence angle to the second divergence angle is a second ratio, and a ratio of the second ratio to the first ratio is greater than 0.56 and less than 1.50.

3. The homogenizing module according to claim 1, wherein the homogenizer is a micro-lens array, the optical elements are a plurality of micro-lens elements, and a size of the micro-lens element in the first direction is greater than a size of the micro-lens element in the second direction.

4. The homogenizing module according to claim 1, further comprising an actuator connected to the anisotropic diffuser and configured to drive the anisotropic diffuser to move.

5. The homogenizing module according to claim 1, wherein the anisotropic diffuser is stationary with respect to the homogenizer.

6. The homogenizing module according to claim 1, wherein the homogenizer has a first optical surface and a second optical surface opposite to each other, the homogenizer is a monolithic micro-lens array, the first optical surface is a surface of the monolithic micro-lens array facing the anisotropic diffuser, the second optical surface is a surface of the monolithic micro-lens array facing away from the anisotropic diffuser, and the optical elements are a plurality of micro-lens elements of the monolithic micro-lens array and are disposed on the first optical surface and the second optical surface.

7. The homogenizing module according to claim 1, wherein the homogenizer has a first optical surface and a second optical surface opposite to each other, and comprises a first micro-lens array and a second micro-lens array aligned with each other, the first optical surface is a surface of the first micro-lens array facing the anisotropic diffuser, the second optical surface is a surface of the second micro-lens array facing away from the anisotropic diffuser, and the optical elements comprise a plurality of micro-lens elements of the first micro-lens array and a plurality of micro-lens elements of the second micro-lens array.

8. A projection apparatus, comprising a light source module, a homogenizing module, a light valve and a projection lens, wherein:
the light source module is configured to provide a beam;
the homogenizing module is located on a transmission path of the beam from the light source module, and is configured to convert the beam into an illumination beam, and the homogenizing module comprises an anisotropic diffuser and a homogenizer, wherein:
the anisotropic diffuser is located on a transmission path of the beam, the beam has a first divergence angle in a first direction and a second divergence angle in a second direction after passing through the anisotropic diffuser, and the first divergence angle is greater than the second divergence angle; and
the homogenizer is located on a transmission path of the beam from the anisotropic diffuser, the homogenizer comprises a plurality of optical elements, and a size of one of the optical elements in the first direction is greater than a size of the one of the optical element in the second direction, wherein the first direction is perpendicular to the second direction;
the light valve is located on a transmission path of the illumination beam, and is configured to convert the illumination beam into an image beam; and
the projection lens is located on a transmission path of the image beam and is configured to project the image beam.

9. The projection apparatus according to claim 8, wherein the beam has a first acceptance angle in the first direction and a second acceptance angle in the second direction after passing through each of the optical elements of the homogenizer, a ratio of the first acceptance angle to the second acceptance angle is a first ratio, and a ratio of the first divergence angle to the second divergence angle is a second ratio, wherein a ratio of the second ratio to the first ratio is greater than 0.56 and less than 1.50.

10. The projection apparatus according to claim 9, wherein the light valve has a long side and a short side, and a ratio of a size of the long side of the light valve to a size of the short side of the light valve is substantially equal to the first ratio.

11. The projection apparatus according to claim 8, wherein the homogenizer is a micro-lens array, the optical elements are a plurality of micro-lens elements, and a size of the micro-lens elements in the first direction is greater than a size of the micro-lens elements in the second direction.

12. The projection apparatus according to claim 8 further comprising an actuator connected to the anisotropic diffuser and configured to drive the anisotropic diffuser to move.

13. The projection apparatus according to claim 8, wherein the anisotropic diffuser is stationary with respect to the homogenizer.

14. The projection apparatus according to claim 8, wherein the homogenizer has a first optical surface and a second optical surface opposite to each other, the homogenizer is a monolithic micro-lens array, the first optical surface is a surface of the monolithic micro-lens array facing the anisotropic diffuser, the second optical surface is a surface of the monolithic micro-lens array facing away from the anisotropic diffuser, and the optical elements are a plurality of micro-lens elements of the monolithic micro-lens array and are disposed on the first optical surface and the second optical surface.

15. The projection apparatus according to claim 8, wherein the homogenizer has a first optical surface and a second optical surface opposite to each other, and comprises a first micro-lens array and a second micro-lens array aligned with each other, the first optical surface is a surface of the first micro-lens array facing the anisotropic diffuser, the second optical surface is a surface of the second micro-lens array facing away from the anisotropic diffuser, and the optical elements comprise a plurality of micro-lens elements of the first micro-lens array and a plurality of micro-lens elements of the second micro-lens array.

\* \* \* \* \*